(12) United States Patent
Kirchmair

(10) Patent No.: US 11,945,626 B2
(45) Date of Patent: Apr. 2, 2024

(54) CONTAINER

(71) Applicant: Single Use Support GmbH, Kufstein (AT)

(72) Inventor: Johannes Kirchmair, Brandenberg (AT)

(73) Assignee: SINGLE USE SUPPORT GMBH, Kufstein (AT)

( * ) Notice: Subject to any disclaimer, the term of this patent is extended or adjusted under 35 U.S.C. 154(b) by 33 days.

(21) Appl. No.: 17/410,329

(22) Filed: Aug. 24, 2021

(65) Prior Publication Data

US 2022/0063875 A1 Mar. 3, 2022

(30) Foreign Application Priority Data

Sep. 2, 2020 (EP) .................................... 20194107

(51) Int. Cl.
*B65D 43/16* (2006.01)
*A61J 1/10* (2006.01)
*A61J 1/14* (2023.01)

(52) U.S. Cl.
CPC .............. *B65D 43/161* (2013.01); *A61J 1/10* (2013.01); *A61J 1/1412* (2013.01); *B65D 2543/00194* (2013.01); *B65D 2543/00296* (2013.01); *B65D 2543/00379* (2013.01)

(58) Field of Classification Search
CPC ......... B65D 43/161; B65D 2543/00379; A61J 1/16; A61J 1/165; A61J 1/10; A61J 1/12; B65B 3/045
See application file for complete search history.

(56) References Cited

U.S. PATENT DOCUMENTS

| 4,991,717 A * | 2/1991 | May ................... B65D 43/0206 220/255 |
| 9,079,690 B1 * | 7/2015 | Pavlik ....................... A61J 1/10 |
| 9,663,266 B2 | 5/2017 | Schwester |
| 9,815,584 B2 | 11/2017 | Schwester |
| 9,968,519 B2 | 5/2018 | Pavlik |
| 10,123,940 B2 | 11/2018 | Pavlik |
| 10,463,571 B2 | 11/2019 | Pavlik |
| 2015/0203243 A1 | 7/2015 | Schwester |
| 2015/0374583 A1 | 12/2015 | Pavlik |

(Continued)

FOREIGN PATENT DOCUMENTS

| EP | 0 686 565 | 12/1995 |
| WO | 2018/129576 | 7/2018 |
| WO | 2019/200145 | 10/2019 |

*Primary Examiner* — Jeffrey R Allen
(74) *Attorney, Agent, or Firm* — Wenderoth, Lind & Ponack, L.L.P.

(57) ABSTRACT

A container is provided for receiving a bag filled with a fluid, in particular a biopharmaceutical fluid, in which connector tubing is attached to the bag. The container includes a dish portion and a lid portion, and the dish portion is divided into a main compartment of the container and a tubing compartment of the container. The lid portion includes a main portion, a tubing portion, and a hinge between the main portion and the tubing portion, and the hinge is adapted to allow for an opening of the tubing portion while the main portion remains closed, such that the bag remains protected in the main compartment while the connector tubing in the tubing compartment is accessible from outside of the container.

14 Claims, 6 Drawing Sheets

(56) References Cited

U.S. PATENT DOCUMENTS

| | | |
|---|---|---|
| 2016/0023797 A1 | 1/2016 | Schwester |
| 2017/0183133 A1 | 6/2017 | Simonsen |
| 2017/0259954 A1 | 9/2017 | Schwester |
| 2018/0228694 A1 | 8/2018 | Pavlik |
| 2019/0046401 A1 | 2/2019 | Pavlik |
| 2019/0224074 A1 | 7/2019 | Wurm |
| 2021/0137787 A1* | 5/2021 | Schyver ............. B65D 81/3816 |

* cited by examiner

CONTAINER

BACKGROUND OF THE INVENTION

The present invention relates to a container for receiving a bag filled with a fluid, in particular a biopharmaceutical fluid, wherein connector tubing is attached to the bag, an arrangement of such a bag inside a container, a method for delivering the fluid, and a usage of a container for such a method.

New forms of treatment of patients with individualized pharmaceuticals, such as biopharmaceuticals, involve pharmaceuticals which are produced for a single patient or small group of patients. These individual pharmaceuticals therefore have to be produced and delivered (i.e. transported) as well as administered in single dosages or small numbers of dosages, so that traditional ways of distributing or delivering such pharmaceuticals are in many cases not practical or even feasible because of the strict requirements for production and delivery of pharmaceuticals.

Among these requirements relevant for the delivery of such pharmaceuticals is the sterility (when filling receptacles with the pharmaceuticals) and consequently the necessity of ensuring the integrity of the receptacles during the delivery process. The present invention is, in particular, concerned with liquid pharmaceuticals filled in bags (as receptacles). Here, ensuring the integrity of the bag means protecting the bag from impacts, pricks and the like which can all cause small damage down to the nanometre scale, because such tiny damage (i.e. holes) can lead to the loss of sterile integrity of the bags.

The nature of such pharmaceuticals often also means that they have to be transported in a frozen state in order to prevent degradation of the product under normal environmental temperatures. The pharmaceuticals are also expected to withstand certain environmental influences (such as impacts) better in frozen state.

Another factor is the large value such small amounts of individual pharmaceuticals can represent. The large value must be seen as both monetary value, because the production process for such pharmaceuticals is very expensive, and in a more general sense, since the loss of a particular pharmaceutical in an inopportune moment can potentially lead to loss of (human or animal) life.

Similar requirements for ensuring the integrity of bags of (bio-) pharmaceutical fluids are known during the production and delivery process for more traditional pharmaceuticals where fluids of such nature have to be transported and handled in bulk, i.e. in larger amounts. In this context, the bag is known as a Single Use Bag. Methods and apparatus for protecting bags filled with large or small amounts are known, for example, from WO 2018129576 A1.

While such solutions are in principle applicable to the special case of delivery of the drugs to a single patient or a small group of patients, they do not yet take into account the special circumstance that the drug is best administered directly from the bag. Bags filled with bulk amounts of biopharmaceutical are in almost all cases processed in specialized facilities for handling the same. Such facilities are of course not expected to be present when the drug is directly administered to a single patient or a small group of patients.

SUMMARY OF THE INVENTION

The object of the present invention is therefore to provide an apparatus where the risk of loss of integrity is not only minimized during the production and transportation phase, but is minimized right until the moment of administering the pharmaceutical contained in the bag.

This is achieved with a container for receiving a bag filled with a fluid, in particular a biopharmaceutical fluid, and connector tubing is attached to the bag. The container comprises a dish portion and a lid portion, and the dish portion is divided into a main compartment of the container and a tubing compartment of the container. The lid portion includes a main portion, a tubing portion, and a hinge between the main portion and the tubing portion, and the hinge is adapted to allow for an opening of the tubing portion while the main portion remains closed, such that the bag remains protected in the main compartment while the connector tubing in the tubing compartment is accessible from the outside.

Regarding the method, the object is achieved by a method in which the bag filled with the fluid together with the connector tubing is arranged in a container, such that the bag is in a main compartment of the container and the connector tubing is in a tubing compartment of the container. The container is closed and delivered to a location where the fluid is to be taken from the bag, and the tubing compartment is opened while the main compartment remains closed, such that the bag remains protected in the main compartment while the connector tubing in the tubing compartment is accessible from the outside. The fluid is taken from the bag via the connector tubing.

A basic aspect of the invention is to use a bag to which connector tubing (can be a single tube or a plurality of tubes) is attached. Therefore, both the bag and the tubing is contained in the container, which can then selectively be opened to only give access to the tubing (compartment) while the bag itself remains protected in the container (namely in the main compartment) potentially all the way through the administering of the pharmaceutical.

Before, while, or after the container is closed with the bag and the connector tubing inside, the fluid can be frozen in order to prevent degradation of the fluid inside the bag and in order to improve the resistance to mechanical influences from the outside during transportation and handling. Before, during, or after the tubing compartment is opened, the fluid can be thawed for use.

Protection is also sought for an arrangement of a container according to the invention, and a bag filled with a fluid and connected (in a fluid communication sense) to connector tubing both (the bag and the connector tubing) disposed inside the container.

Protection is also sought for using a container according to the invention for a method according to the invention.

It should be mentioned that part of the connector tubing (or simply tubing) can also be in the main compartment and reach over to the tubing compartment in an arrangement according to the invention.

The connector tubing can be flexible in order to allow for a bending of the connector tubing in order to facilitate a relatively easy connecting process to outside of the apparatus, for example, for administering the pharmaceutical.

The dish portion and/or the lid portion can be manufactured in one piece, such as in an injection moulding process.

All technical characteristics and effects described in connection with the prior art can also be provided according to the invention.

The fluid in the bag can preferably be a liquid, particularly preferably a (bio-) pharmaceutical liquid.

The dish portion can be divided into the main compartment and the tubing compartment through a constriction of the dish portion, which constriction is preferably adapted to hold the connector tubing through a squeezing action between the constriction and the lid portion. Such a constriction (i.e., a narrowing of the cross section of the inside of the container), can be an easy way of manufacturing the divide between the main compartment and the tubing compartment.

Holding the connector tubing in the vicinity of the divide between the main compartment and the tubing compartment (in particular through the mentioned squeezing action in the constriction) can be beneficial as it helps prevent movement of the bag and/or the tubing inside the container which could lead to loss of integrity.

The hinge can be a flexural hinge which allows for bending of the tubing portion relative to the main portion, which can facilitate easy manufacturing of the container according to the invention. Other forms of hinges (e.g. with moving parts) are of course conceivable in the context of the invention.

The lid portion can be attached to the dish portion, preferably by a further (second) hinge. Like the first hinge, the second hinge can for example be a flexural hinge.

The lid portion, in particular the main portion, the tubing portion, and/or the hinge can be transparent. This gives operating personnel the opportunity to visually check the bag and/or the connector tubing.

For an easy manufacturing process, the dish portion can be made of the same material as the lid portion. Consequently, the dish portion can also be made of a transparent material.

At least one layer of foam can be present inside the container. Firstly, such a foam can improve the protection of the bag and/or the connector tubing inside the container.

Furthermore, the foam can compensate for a volume increase of the fluid in the bag which occurs during freezing of the same (due to the negative thermal expansion of water). This volume increase during freezing can result in damage or destruction of the container if there are no measures taken to accommodate for the volume increase.

After freezing, the at least one layer of foam has preferably adapted to the new shape of the bag. Since the foam also becomes harder due to the lower temperatures, the foam can at least partly, preferably fully, immobilize the bag and/or the tubing. Immobilizing the bag and/or the connector tubing can be beneficial for protecting the bag and/or the connector tubing by preventing mechanical stress thereon.

Regarding the at least one layer of foam, reference is made to WO 2018129576 A1, which contains further technical details and effects regarding the at least one layer of foam.

The dish portion and/or the lid portion can be made of a plastic—preferably a thermoplastic.

The bag can be made of two layers of thermoplastic welded together on the edge(s). In some applications, the bag is the called a Single Use Bag.

The material for the connector tubing can, for example, be silicone or other materials which stay flexible for a prolonged period of time.

The lid portion can be secured in a closed position relative to the dish portion by way of frictional locking connections. For this, protrusions can be present on the lid portion and/or the dish portion which fit tightly into recesses on the counterpart (i.e. the dish portion or the lid portion). Such frictional locking connections can be used to secure both the main portion of the lid portion and/or the tubing portion of the lid portion independently of each other.

Other locking connections for these purposes are in principle conceivable, such as positive locks (i.e. locks using the shape of objects).

BRIEF DESCRIPTION OF THE DRAWINGS

Further details and advantages of the invention are apparent from the figures and the accompanying figure description. The figures show.

DETAILED DESCRIPTION OF THE INVENTION

Figure 1:
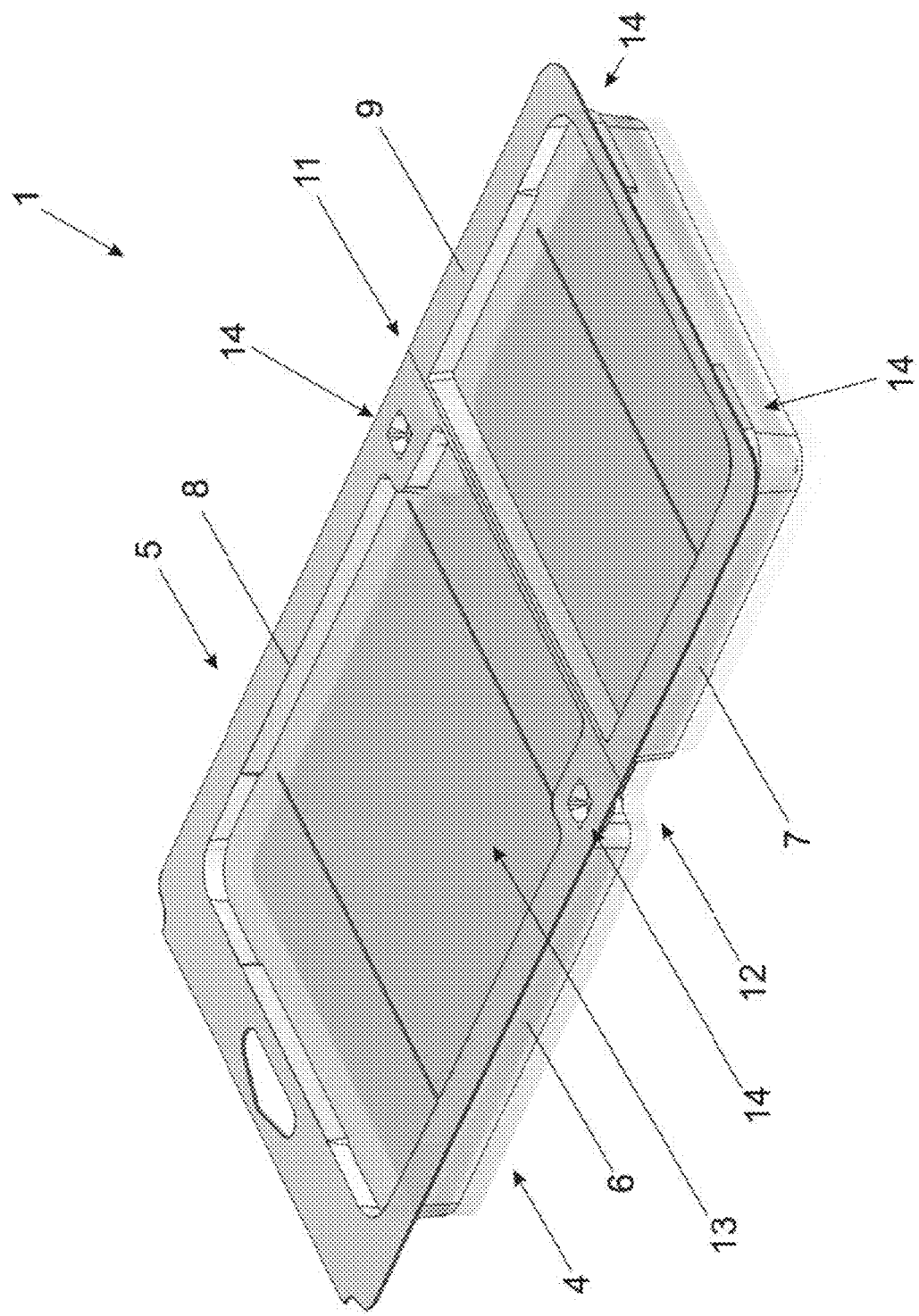
FIG. 1 shows a container according to the invention in closed configuration.

FIG. 1 shows an embodiment of a container 1 according to the invention. It comprises a dish portion 4 and a lid portion 5. The dish portion 4 is divided into a main compartment 6 and a tubing compartment 7 by a constriction 12 in the shape of the container 1.

The main compartment 6 is closed off by the main portion 8 of the lid portion 5. The tubing compartment 7 is closed off by the tubing portion 9 of the lid portion 5.

The main portion 8 of the lid portion 5 is connected to the tubing portion 9 of the lid portion 5 by a flexural hinge (first hinge) 11 so as to allow for a swivel action of the tubing portion 9 relative to the main portion 8.

The flexural hinge can, for example, be embodied as material thinning so as to allow bending of the material in the area of the flexural hinge (first hinge) 11.

In this embodiment, the dish portion 4 and the lid portion 5 are also connected to each other by a further (second) hinge 11. In this way, the dish portion 4 and the lid portion 5 can be manufactured in one process, e.g., by an injection moulding process using plastic. Embodiments where the lid portion 5 is separate from the dish portion 4 are of course conceivable.

Both the main portion 8 of the lid portion 5 and the tubing portion 9 of the lid portion are locked in the closed configuration by frictional locking connections 14.

These each include a protrusion and a matching recess of different shapes, such that friction between the protrusions and the recesses lock the main portion 8 of the lid portion 5 and the tubing portion 9 of the lid portion 5 to the dish portion 4 due to the sizing of the protrusions and the recesses.

Arranged in the dish portion 4 is a layer of foam 13 the function of which will be described in connection with FIGS. 5 to 6.

Figure 2:
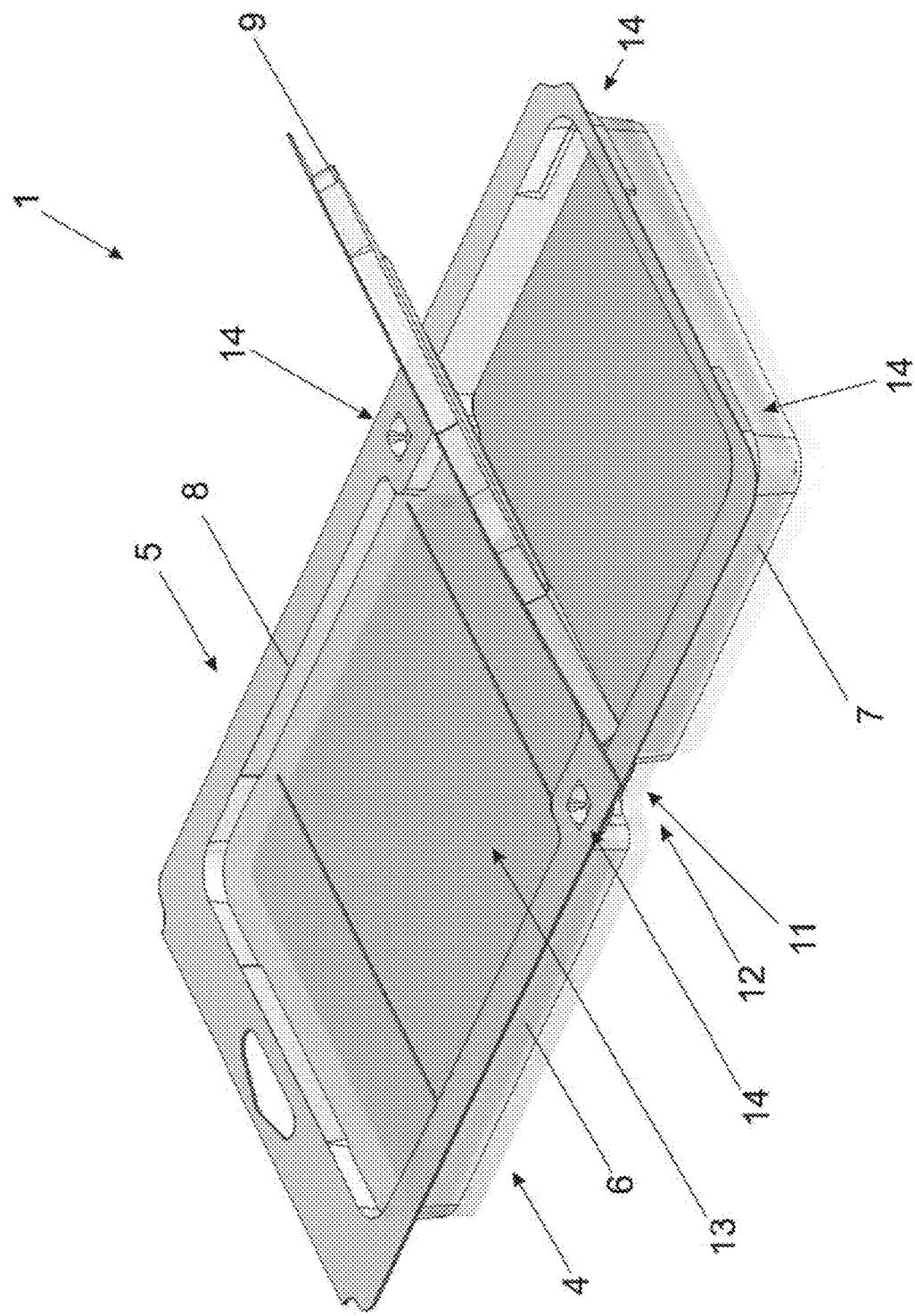
FIG. 2 shows a container according to the invention in a configuration where the main compartment is closed and the tubing compartment is opened.

FIG. 2 shows the embodiment of FIG. 1 in a configuration where the tubing compartment 7 is opened (i.e., the tubing portion 9 of the lid portion 5 is opened, independently of the closed configuration of the main compartment 6/main portion 8 of the lid portion 5).

Figure 3:
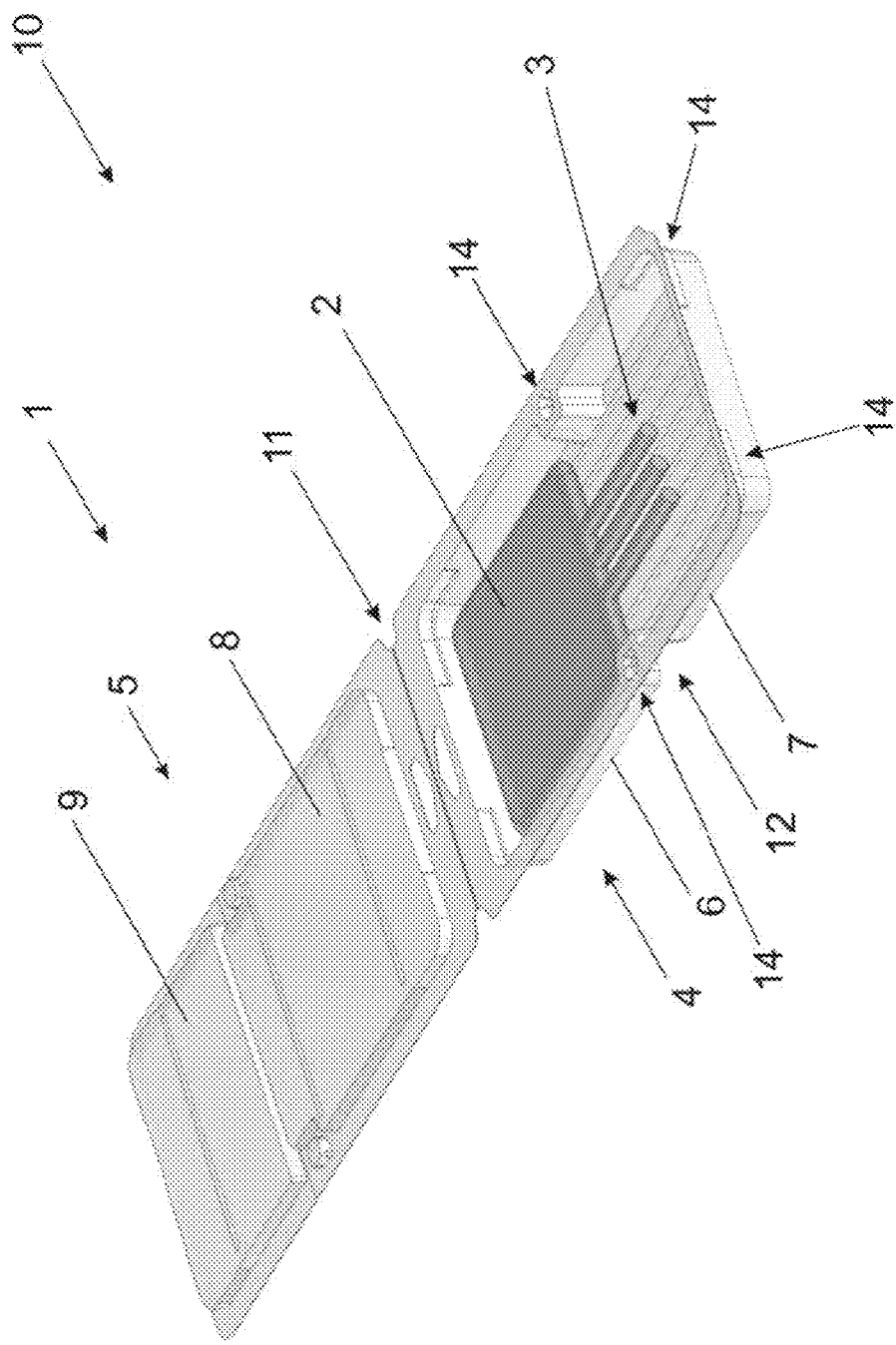
FIG. 3 shows an arrangement according to the invention where the container is in a completely open configuration.

FIG. 3 shows an arrangement 10 according to the invention where the bag 2 together with the connector tubing 3 is arranged in the container 1 of FIG. 1, however without the layer of foam 13 (described in connection with FIGS. 5 and 6. In other words, it is possible to use the container 1 according to the invention in an arrangement 10 according to the invention with or without the layer of foam 13.

The bag 2 has been filled with a biopharmaceutical liquid (i.e. a biopharmaceutical medicine) and placed inside the container 1.

In FIG. 3, the container 1 is completely open. In particular, both the main compartment 6 and the tubing compartment 7 are opened by the further (second) hinge 11 between the dish portion 4 and the lid portion 5.

Figure 4:
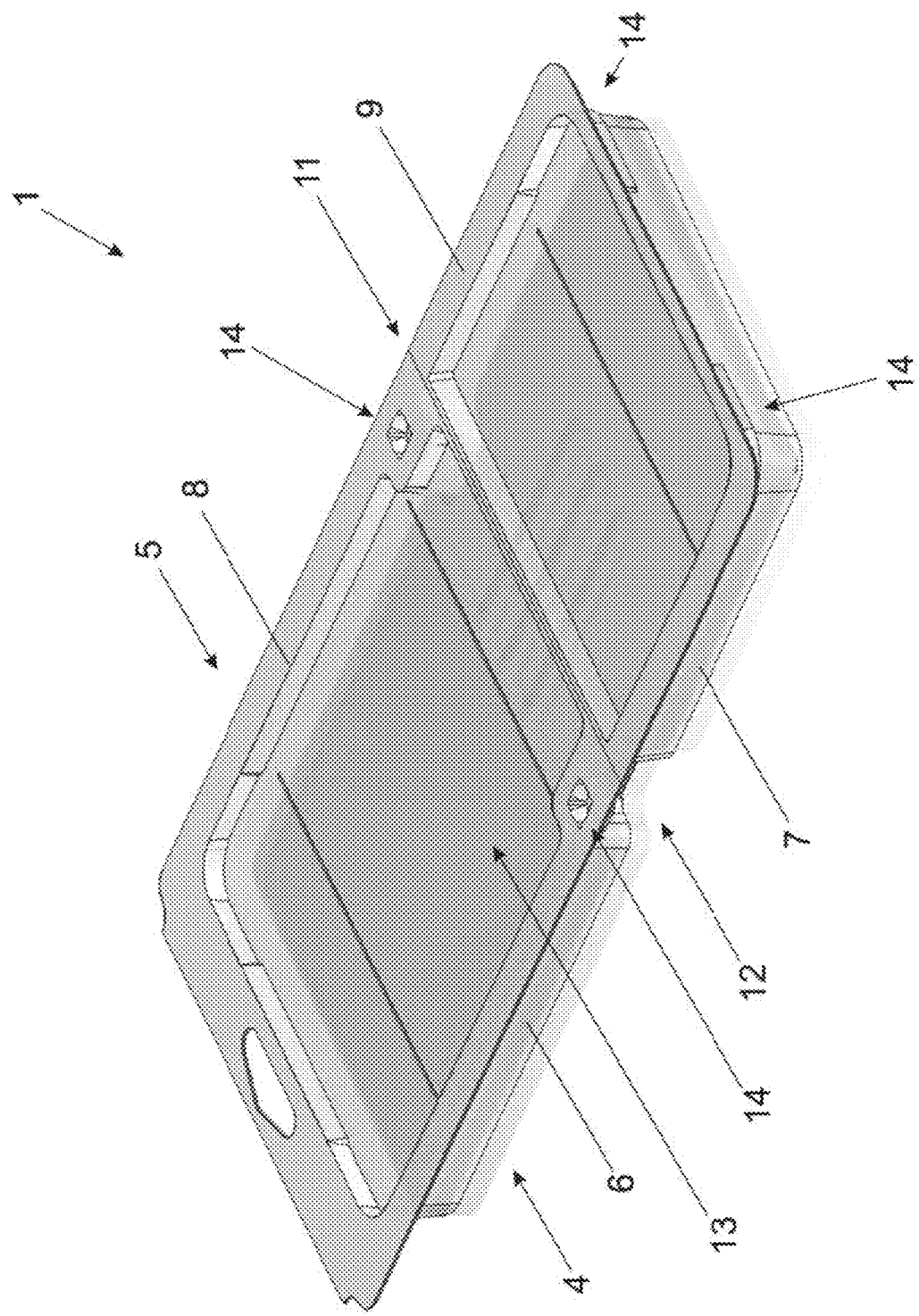
FIG. 4 shows an arrangement according to the invention where the container is in a completely closed configuration.

FIG. 4 shows an arrangement 10 according to the invention where the bag 2 together with the connector tubing 3 is arranged inside the container 1 of FIG. 1. The bag 2 has been filled with a biopharmaceutical liquid (i.e. a biopharmaceutical medicine) and placed inside the container 1. The container 1 then has been closed into the configuration of FIG. 1. As can be seen from FIGS. 3 and 4, the container 1 completely encloses the bag 2 with the connector tubing 3 when the dish portion 4 and the lid portion 5 of the container 1 are completely closed ("completely closed" meaning both the main portion 8 and the tubing portion 9 of the lid portion 5 are closed as in FIG. 4).

It is noted that the connector tubing 3 is slightly squeezed in a constriction 12 of the container 1 so as to hold the connector tubing 3 in place. As can be seen particularly well in FIGS. 5 and 6, the constriction 12 is located between the hinge (first hinge) 11 of the lid portion 5 and the main compartment 6 of the dish portion 4

As a next step, the arrangement 10 can be placed inside a freezer in order to freeze the liquid inside the bag 2. During the freezing, the liquid experiences an increase in volume which causes also an increase of the size of the bag 2. This can exert a force on the container which—as mentioned before—can lead to damage and even destruction of the container 1. The container 1 can then not serve the purpose of protecting the bag 2 and the connector tubing 3 from outside influence in order to reduce the risk of loss of sterile integrity of the bag 2 together with the connector tubing 3.

In order to prevent this, the layer of foam 13 (see FIGS. 5 and 6) compensates for the volume/size increase of the liquid/the bag 2. Because the foam also becomes harder because of the low temperatures, the foam forms a conformal bedding for the bag 2 and the connector tubing 3, such that the bag 2 and the connector tubing 3 is immobilized inside the container 1. Impacts of the bag 2 and/or the connector tubing 3 onto the inside of the container 1 because of movement of the container 1 are therefore prevented to a large extent, which serves to improve the protection of the bag 2 and the connector tubing 3.

Now the arrangement 10 according to the invention can be transported and delivered with the liquid in a frozen state. It is of course also possible to transport the arrangement without freezing the liquid.

At or near the point of use (e.g., where the pharmaceutical is to be administered), the liquid can be thawed such that the volume increase and the hardening of the foam is reversed.

Before, during, but preferably after, the thawing process, the tubing portion 9 of the lid portion 5 can be opened so as to allow for access to the tubing compartment 7. This configuration of the arrangement is depicted in FIGS. 5 and 6.

The connector tubing 3 can now be connected to some outside apparatus for example for administering the pharmaceutical on a patient.

It should be noted that the liquid in the bag 2 has been protected in the closed main compartment 6 during the whole time from putting the bag 2 into the container 1 until the administering of the pharmaceutical, potentially until the administering of the pharmaceutical is finished, upon which the container together with its contents can be disposed.

Figure 5:
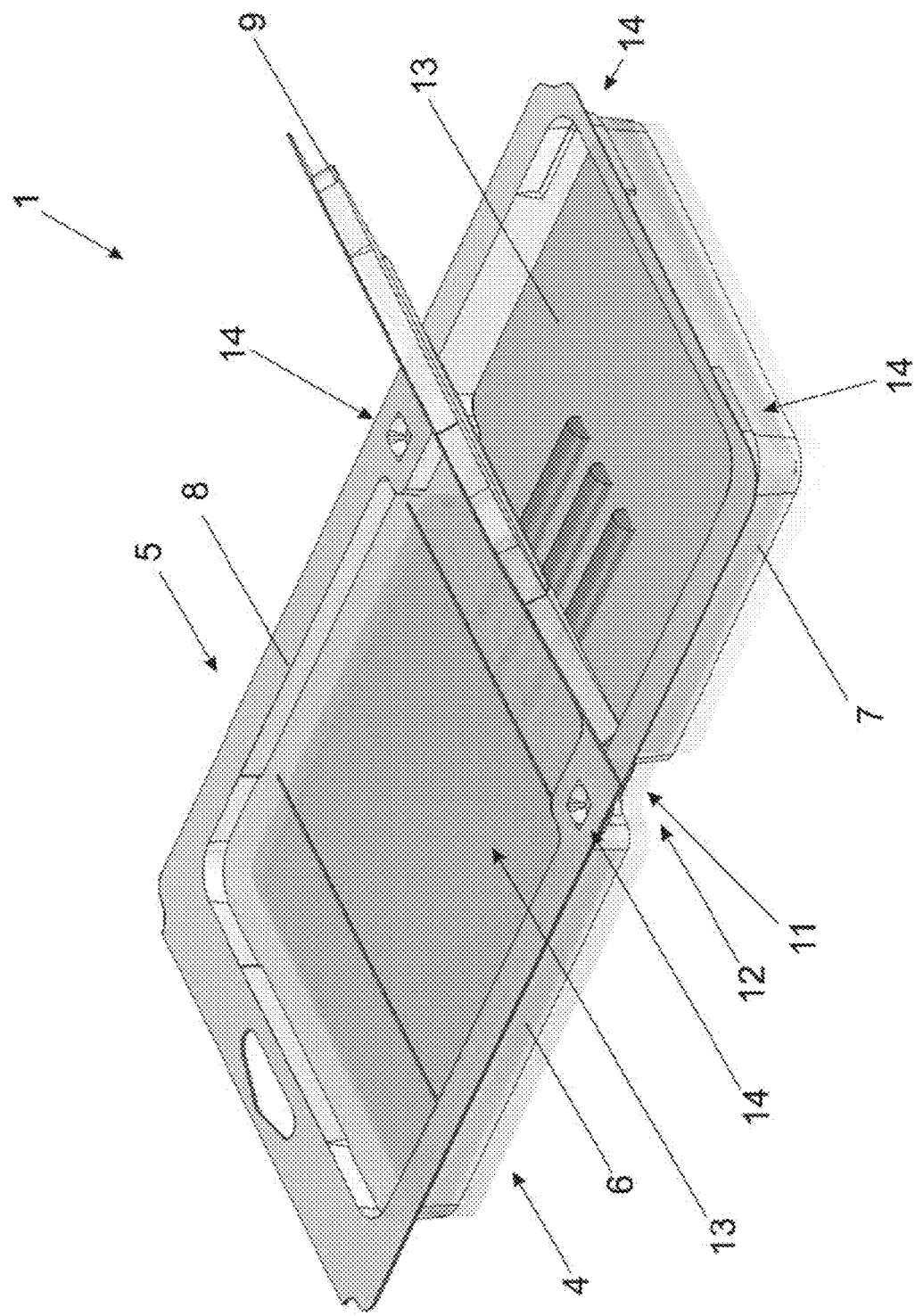
FIGS. 5 and 6 show the arrangement of FIG. 4 where the main compartment is closed and the tubing compartment is opened.
Figure 6:
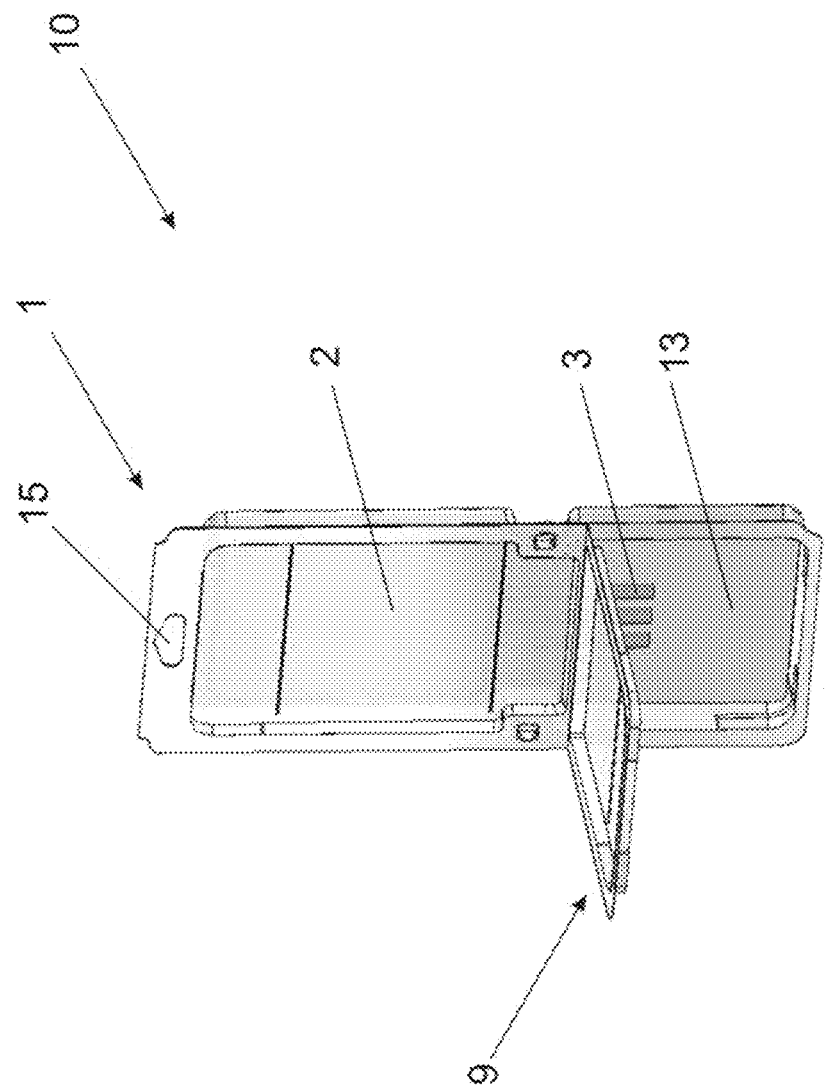

In FIGS. 5 and 6 the layer of foam 13 described before is visible.

FIG. 6 shows the configuration of FIG. 5, where the container is in an upright position. This is a preferred position for emptying the bag 2 inside the container if the tubing 3 is connected (not shown), for example, to further tubing for administering the pharmaceutical.

For ease of use, the container comprises an opening 15 on which the container can be hung from a hook or the like.

The invention claimed is:

1. A container for receiving a bag filled with a fluid, wherein connector tubing is attached to the bag, the container comprising:
    a dish portion; and
    a lid portion,
    wherein the dish portion is divided into a main compartment of the container and a tubing compartment of the container,
    wherein the lid portion includes a main portion, a tubing portion, and a hinge between the main portion and the tubing portion,
    wherein the hinge is configured to allow for an opening of the tubing portion and tubing compartment while the main portion and main compartment remain closed, such that the bag remains protected in the main compartment while the connector tubing in the tubing compartment is accessible from outside of the container,
    wherein the dish portion has a constriction dividing the dish portion into the main compartment and the tubing compartment, the constriction being configured to hold the connector tubing through a squeezing action between the constriction and the lid portion, and
    wherein the constriction is arranged between the hinge and the main compartment.

2. The container according to claim 1, wherein the hinge is a flexural hinge to allow for bending of the tubing portion relative to the main portion.

3. The container according to claim 1, wherein at least one of the main portion, the tubing portion, and the hinge of the lid portion is transparent.

4. The container according to claim 1, wherein at least one layer of foam is present inside the container.

5. The container according to claim 1, wherein at least one of the dish portion and the lid portion are made of a plastic.

6. The container according to claim 1, wherein the lid portion is configured to be secured in a closed position relative to the dish portion by frictional locking connections.

7. An arrangement comprising the container according to claim 1 and a bag filled with a fluid and connected to connector tubing, wherein both the bag and the connector tubing are disposed inside the container.

8. A method of delivering a fluid in a bag attached to connector tubing, the method comprising:
    arranging the bag filled with the fluid together with the connector tubing in the container such that the bag is in a main compartment of the container and the connector tubing is in a tubing compartment of the container, the container having a constriction dividing the container into the main compartment and the tubing compartment, the constriction being configured to hold the connector tubing through a squeezing action between the constriction and a lid portion of the container, the lid portion of the container including a main portion to cover the main compartment, a tubing portion to cover the tubing compartment, and a hinge between the main portion and the tubing portion, the constriction being arranged between the hinge and the main compartment of the container;

closing the container and delivering the container to a location where the fluid is to be withdrawn from the bag;

opening the tubing compartment while the main compartment remains closed, such that the bag remains protected in the main compartment while the connector tubing in the tubing compartment is accessible from the outside of the container, and withdrawing the fluid from the bag via the connector tubing.

9. A method of using the container according to claim 1 in a method of delivering a fluid in the bag attached to connector tubing, wherein:

arranging the bag filled with the fluid together with the connector tubing in the container such that the bag is in the main compartment of the container and the connector tubing is in the tubing compartment of the container;

closing the container and delivering the container to a location where the fluid is to be withdrawn from the bag;

opening the tubing compartment while the main compartment remains closed, such that the bag remains protected in the main compartment while the connector tubing in the tubing compartment is accessible from the outside of the container, and withdrawing the fluid from the bag via the connector tubing.

10. The container according to claim 1, wherein at least one of the dish portion and the lid portion are made of a thermoplastic.

11. The container according to claim 1, wherein the container is configured to completely enclose the bag with the connector tubing when the dish portion and the lid portion of the container are completely closed.

12. The arrangement according to claim 7, wherein the bag is configured to contain a biopharmaceutical fluid.

13. The method according to claim 8, wherein the bag is configured to contain a biopharmaceutical fluid.

14. The method according to claim 8, wherein the container is configured to completely enclose the bag with the connector tubing when the dish portion and the lid portion of the container are completely closed.

* * * * *